US005781980A

United States Patent [19]

Golston

[11] Patent Number: 5,781,980

[45] Date of Patent: Jul. 21, 1998

[54] DISPLAY WITH MOLDED SPRING

[75] Inventor: S. Webb Golston, Denton, Tex.

[73] Assignee: Golston Company, Sanger, Tex.

[21] Appl. No.: 512,231

[22] Filed: Aug. 7, 1995

[51] Int. Cl.$^6$ ........ B23P 11/02

[52] U.S. Cl. ........ 29/450; 40/649; 40/765

[58] Field of Search ........ 29/450, 451, 453; 40/649, 611, 765, 776; 403/325, 327, 329

[56] References Cited

U.S. PATENT DOCUMENTS

| | | | |
|---|---|---|---|
| 1,358,534 | 11/1920 | Finch | 40/765 |
| 1,895,938 | 1/1933 | Mutschler | 40/611 |
| 3,918,187 | 11/1975 | Vogele | 40/611 |
| 4,505,395 | 3/1985 | Nathan | 211/126 |
| 4,638,844 | 1/1987 | Hayashiguchi | 160/23 R |
| 4,805,331 | 2/1989 | Boggess et al. | 40/611 |
| 4,835,889 | 6/1989 | McClymonds | 40/611 |
| 4,969,633 | 11/1990 | Ryan | 267/47 |
| 5,002,493 | 3/1991 | Brown et al. | 439/65 |
| 5,018,291 | 5/1991 | Pasquale et al. | 40/611 |
| 5,125,505 | 6/1992 | Kurosaki | 40/649 |
| 5,138,780 | 8/1992 | Kunkel | 40/765 |
| 5,160,832 | 11/1992 | Hubert et al. | 235/145 R |
| 5,164,871 | 11/1992 | Hughes et al. | 360/133 |
| 5,257,762 | 11/1993 | Trame et al. | 248/50 |
| 5,353,536 | 10/1994 | Erber et al. | 40/611 |
| 5,442,871 | 8/1995 | Sarkisian et al. | 40/611 |
| 5,457,905 | 10/1995 | Kaplan | 40/611 |

FOREIGN PATENT DOCUMENTS

| | | | |
|---|---|---|---|
| 2224152 | 4/1990 | United Kingdom | 40/611 |

OTHER PUBLICATIONS

Brochure, Golston Architectural Signs, A Sign for the Times, 6 pages, 1989 or 1990.

*Primary Examiner*—Joseph M. Gorski
*Assistant Examiner*—Katrina Davis
*Attorney, Agent, or Firm*—Sidley & Austin

[57] ABSTRACT

A sign holder (10) is disclosed which has a professional appearance but allows the sign insert (16) therein to be readily removed and replaced. An integrally molded spring assembly (34) including cantilevered springs (38, 40) is formed on the backplate (12). A frame (20) is mounted on the backplate (12). The sign insert (16) is placed on the inner surface (14) of the backplate (12) and a clear lens (18) is inserted so that a first edge (46) of the lens deflects the springs (38, 40). With sufficient deflection, the opposite edge (50) of the lens can clear the edge (52) of the frame to permit the lens to fit within the space (54) between the back plate and frame. The lens is released, permitting the springs to be released and push the lens so that the opposite edge (50) of the lens moves underneath the edge (52) of the frame to hold the sign insert and lens within the space between the backplate and frame.

17 Claims, 2 Drawing Sheets

DISPLAY WITH MOLDED SPRING

TECHNICAL FIELD

This invention relates to a display, and in particular to an improved display assembly for ready removal and insertion of the display card therein.

BACKGROUND OF THE INVENTION

It is common in hospitals, offices and the like to have a sign holder mounted on the wall holding a sign indicating the business within the office or the individual or function located within that office.

It is desirable that the sign or label within the sign holder be readily removable and replaceable to minimize the burden of changing the sign when occupancy changes. On the other hand, sign holders which, in the past, have provided for ease of removing the sign therein, have often appeared cheap and inexpensive. Of course, it is desirable at all times to have the most professional looking and high quality appearance sign holder possible. A need exists for a professional looking sign holder which still has the advantage of permitting the sign therein to be readily replaced.

SUMMARY OF THE INVENTION

In accordance with one aspect of the present invention, a sign holder is provided which includes a backplate having a spring attached thereto. A frame is mounted on the backplate and a lens is secured between the backplate and the frame to hold a sign. The lens is held between the backplate and the frame by the spring mounted on the backplate. In accordance with another aspect of the present invention, the spring is integrally molded as part of the backplate.

In accordance with another aspect of the present invention, a method of assembling a sign holder is provided. The method includes the step of inserting a first edge of a lens into a space between a frame and backplate to compress an integral spring mounted on the backplate. The method further includes the step of pivoting the entire lens into the space between the frame and backplate with the integral spring compressed sufficiently to permit the edge opposite the first edge of the lens to clear an edge on the frame. The method further includes the step of releasing the lens to allow the spring to expand sufficiently to move the opposite edge of the lens under the edge of the frame to secure the lens in the space.

In accordance with another aspect of the method, the method further includes the step of molding a backplate with the spring integrally molded therewith.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION

Figure 1:
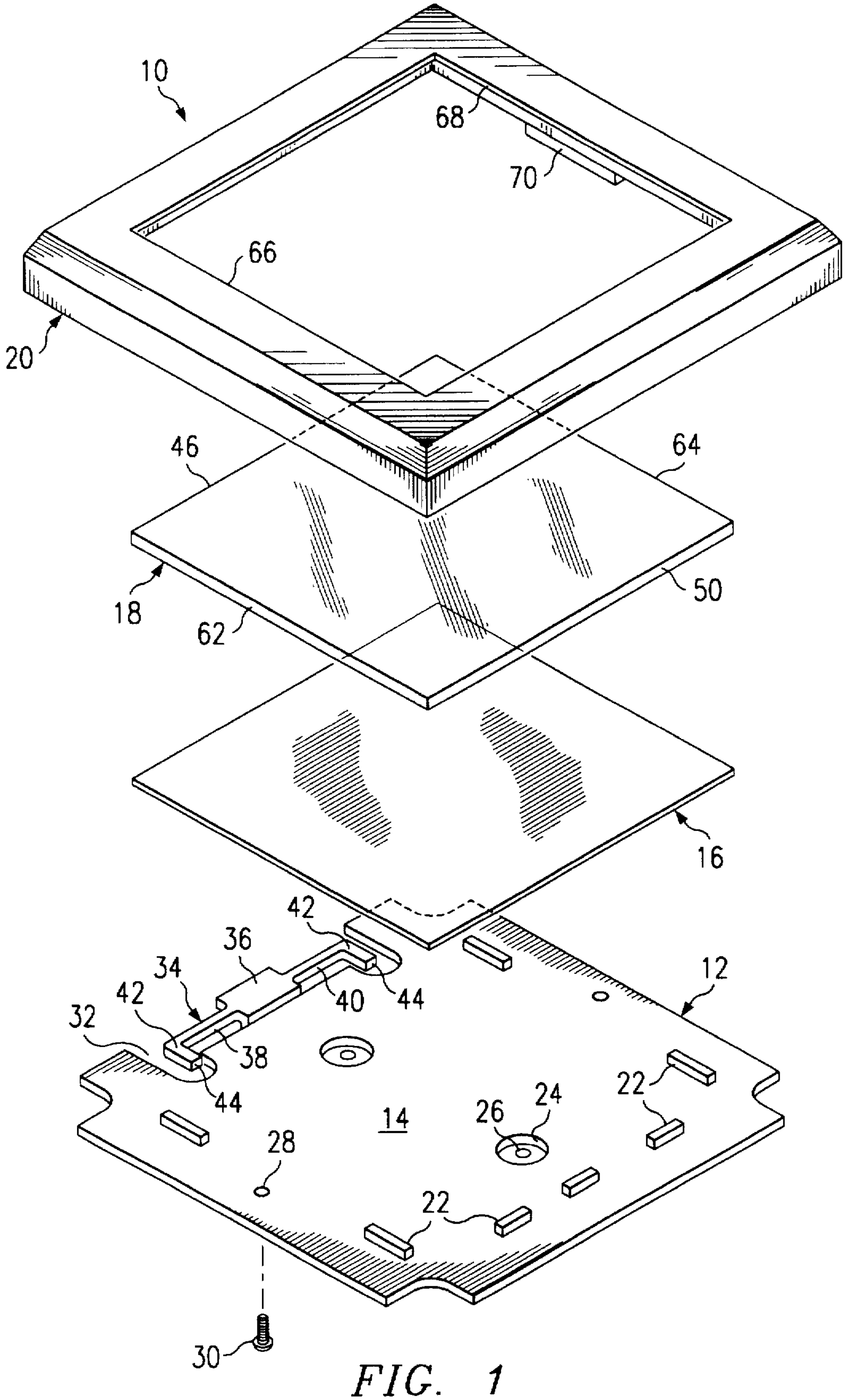
FIG. 1 is an exploded view of a sign holder forming a first embodiment of the present invention.

With reference now to the accompanying figures and the following detailed description, a sign holder 10 forming a first embodiment of the present invention is described.

The sign holder 10 includes a backplate 12 which has an inner surface 14 for supporting the back of a paper sign insert 16. A clear lens 18 overlies the insert and a frame 20 surrounds the clear lens and insert, and attaches to the backplate 12.

With further reference to the backplate 12, it can be seen to be an integrally molded unit having a number of guide blocks 22 extending from the inner surface 14 to center the insert 16 and lens 18 and to assist in spacing frame 20 relative the backplate 12 20. Further, a series of depressed apertures 24 are formed in the backplate 12, each having a hole 26 therethrough, to facilitate fastening the backplate to the wall or door on which the sign holder is used. The spacers are recessed below the inner surface 14 to accommodate the head of a screw or the like, preventing the screw head from extending above the plane of inner surface 14 and interfering with the insert 16. Holes 28 formed through the backplate 12 are used with screws 30 to fasten the frame 20 onto the backplate 12.

The backplate 12 also is formed with a cut-out portion 32 and an integral spring assembly 34. The integral spring assembly 34 is formed of a spring block 36, which extends above the inner surface 14, and a pair of cantilevered springs 38 and 40 which extend from opposite ends of the spring block 36. Each of the springs 38 and 40 has an inwardly turned end 42 having end surface 44.

Figure 2A:
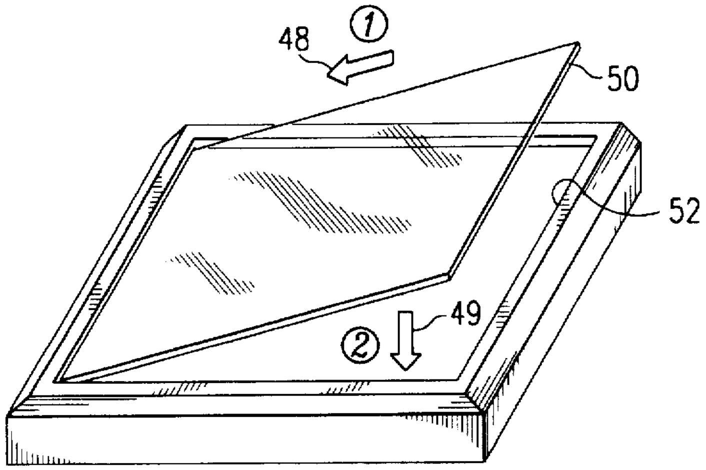
FIGS. 2A and 2B illustrate the insertion of the lens in the sign holder.
Figure 2B:
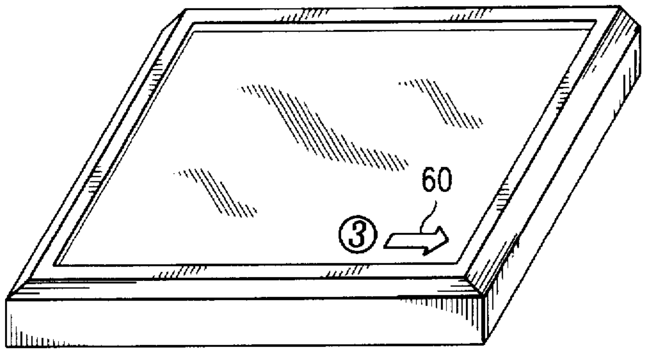
Figure 3:
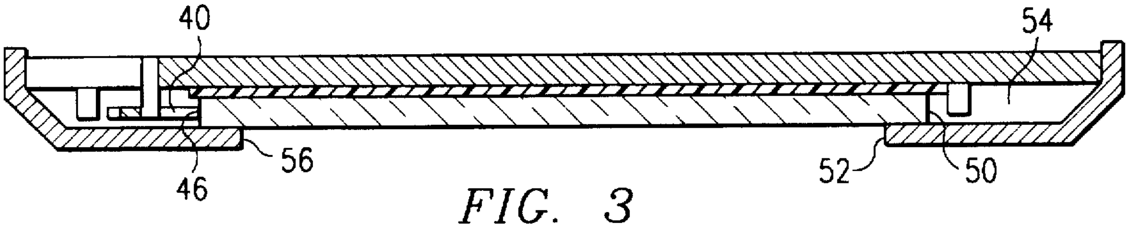
FIG. 3 is a cross-sectional view of the sign holder illustrating the integral spring securing the lens within the sign holder.

As can best be seen in FIGS. 2A, 2B and 3, the frame 20 is first fastened to the backplate 12 and the backplate is then secured to the wall or door. The paper sign insert 16 is then laid on the inner surface 14 of the backplate. The clear lens 18 is then positioned at an angle relative to the backplate and frame, as seen in FIG. 2A, with a first edge 46 thereof contacting the springs 38 and 40 at their end surfaces 44. The clear lens is pushed in the direction of arrow 48 to compress or deflect the springs 38 and 40 toward the edge of the backplate sufficiently so that the opposite edge 50 of the clear lens 18 will clear the edge 52 of the frame 20 when the clear lens is pivoted in the direction of arrow 49 into the space 54 between the frame and the backplate, parallel to the inner surface and paper sign insert 16.

When the clear lens 18 is fully within the space 54, the lens is released. The springs 38 and 40 will rebound and expand to move the edge 50 of the clear lens 18 past and underneath the edge 52 of the frame as seen in FIG. 3. In this position, the clear lens 18 is securely held within the space 54 between the frame 20 and backplate 12 at opposite edges of the clear lens 18, specifically the first edge 46 beneath the adjacent edge 56 of the frame and the edge 50 beneath the edge 52 of the frame.

If the sign holder is oriented so that the integral springs 38 and 40 are at the bottom of the sign holder when the sign holder is mounted on the door or wall on which it is used, the space 54 can extend a considerable distance above the edge 50 as illustrated in FIG. 3. Gravity will then keep the lens in the proper position. However, it is preferred that the space 54 is limited to prevent the edge 50 from moving so far underneath the edge 52 that the first edge 46 can fall out of or be displaced from the space past edge 56. Guide blocks 22 can serve this function. If desired, a second set of cantilevered springs 38 and 40 can be molded on the backplate on the side of the backplate opposite springs 38 and 40 to assist holding the clear lens 18 in position between the frame 20 and backplate 12.

To change the sign insert 16, the clear lens 18 need only be moved in the direction opposite arrow 60 as seen in FIG. 2B until the edge 50 clears the edge 52 on the frame 20. The lens can then be tilted or pivoted in the direction opposite arrow 49 up to the position shown in FIG. 2A, preferably using a suction cup of the type commonly used in the industry, permitting the glass lens to be removed from the frame and backplate altogether. With the paper sign insert 16 thus exposed, the insert can be removed and replaced with a new insert. The clear lens 18 is simply then reinstalled into the space 54 as described previously.

The frame, backplate and lens are preferably formed of injection molded plastic or fabricated of plastic or other materials. The paper sign insert 16 can be printed on paper or other suitable material. The frame and backplate can be assembled by screws 30, or ultrasonically welded, heat stacking, adhesive or snap fit.

An important purpose of the invention is to provide the user a holder of a message that can be created on equipment common in most businesses today. With a computer and laser printer, the user can compose and print on paper the message and easily create a sign insert 16. When it is necessary to change the message, it is a very simple task to remove the lens and old insert and install the new insert. This conserves all but the paper sign insert itself. There would be no need for expensive printing or engraving of parts which are subsequently thrown away.

The distance between opposite edges 62 and 64 of the clear lens 18 is slightly less than the distance between edges 66 and 68 on the frame to permit the clear lens 18 to be fit within the space between the frame and backplate yet have no gap noticeable from a reasonable distance between the edges.

The frame 20 can further have extensions 70 formed downwardly from the edges 66 and 68 toward the inner surface 14 which prevent the edges 62 and 64 of lens 18 from sliding underneath edges 66 and 68, respectively, to maintain the lens centered therein. The guide blocks 22 and extensions 70 provide a uniform clearance between the edges of the frame and the inner surface 14 to fit the clear lens 18. The cantilevered springs 38 and 40 are sized to move freely within the space between the edges and inner surface yet fill most of that gap so that the first edge 46 of the clear lens will consistently engage the springs 38 and 40 when inserting or removing the lens.

Although a single embodiment of the invention has been illustrated and described with numerous specific details in the foregoing description and accompanying drawings, it will be understood that the invention is not limited to the embodiment disclosed, but is capable of numerous rearrangements, modifications and substitutions of parts and elements without departing from the spirit and scope of the invention.

I claim:

1. A method for assembling a sign holder, comprising the steps of:

providing a backplate having a spring mounted on one end thereof, providing a frame having a border defining a central opening;

assembling said backplate to said frame such that a space exists between said border and said backplate, with said spring located within the space;

providing a lens having first and second opposite edges separated by a distance greater than a width of said central opening;

inserting said first edge of said lens into said space such that said edge contacts said spring and compresses it away from said central opening in a direction substantially parallel to said backplate;

pivoting the lens further into said space until said lens is substantially parallel to said backplate, thereby further compressing said spring in said direction and further inserting said first edge into said space, such that said first edge is completely located beneath said border; and then releasing the lens, thereby causing said spring to expand such that said spring moves said second edge of said lens underneath said border while said first edge remains underneath said border, and thereby securing said lens in the space between said frame and said backplate.

2. A method comprising the steps of:

providing a backplate having an integrally molded spring at one end thereof;

providing a frame having a border defining a central opening;

assembling said backplate to said frame such that a space exists between said border and said backplate, with said spring located within the space;

providing a lens having first and second opposite edges separated by a distance greater than a width of said central opening;

inserting said first edge of said lens into said space such that said edge contacts said spring and compresses it away from said central opening in a direction substantially parallel to said back plate;

pivoting the lens further into said space until said lens is substantially parallel to said backplate, thereby further compressing said spring in said direction and further inserting said first edge into said space, such that said first edge is completely located beneath said border; and then releasing the lens, thereby causing said spring to expand such that said spring moves said second edge of said lens underneath said border while said first edge remains underneath said border, and thereby securing said lens in the space between said frame and said backplate.

3. The method of claim 1 wherein the step of assembling said backplate to said frame further includes the step of securing said backplate to said frame with threaded fasteners.

4. A method for assembling a sign holder, comprising the steps of:

providing a backplate having a spring mounted on one end thereof;

providing a frame having a border defining a central opening;

assembling said backplate to said frame such that a space exists between said border and said backplate, with said spring located within the space;

providing a lens having first and second opposite edges separated by a distance greater than a width of said central opening;

inserting said first edge of said lens into said space such that said edge contacts said spring and compresses it away from said central opening in a direction substantially parallel to said back plate;

pivoting the lens further into said space until said lens is substantially parallel to said backplate, thereby further compressing said spring in said direction and further inserting said first edge into said space, such that said first edge is completely located beneath said border;

releasing the lens, thereby causing said spring to expand such that said spring moves said second edge of said lens underneath said border while said first edge remains underneath said border, and thereby securing said lens in the space between said frame and said backplate;

orienting the frame relative the backplate when assembling the backplate to the frame by causing said frame to contact guideblocks formed on an inner surface of said backplate.

5. A method for assembling a sign holder, comprising the steps of:

providing a backplate having a spring mounted on one end thereof;

providing a frame having a border defining a central opening;

assembling said backplate to said frame such that a space exists between said border and said backplate, with said spring located within the space;

providing a lens having first and second opposite edges separated by a distance greater than a width of said central opening;

inserting said first edge of said lens into said space such that said edge contacts said spring and compresses it away from said central opening in a direction substantially parallel to said back plate;

pivoting the lens further into said space until said lens is substantially parallel to said backplate, thereby further compressing said spring in said direction and further inserting said first edge into said space, such that said first edge is completely located beneath said border;

releasing the lens, thereby causing said spring to expand such that said spring moves said second edge of said lens underneath said border while said first edge remains underneath said border, and thereby securing said lens in the space between said frame and said backplate.

6. A method for assembling a sign holder, comprising the steps of:

providing a backplate having a spring mounted on one end thereof;

providing a frame having a border defining a central opening;

assembling said backplate to said frame such that a space exists between said border and said backplate, with said spring located within the space;

providing a lens having first and second opposite edges separated by a distance greater than a width of said central opening;

inserting said first edge of said lens into said space such that said edge contacts said spring and compresses it away from said central opening in a direction substantially parallel to said back plate;

pivoting the lens further into said space until said lens is substantially parallel to said backplate, thereby further compressing said spring in said direction and further inserting said first edge into said space, such that said first edge is completely located beneath said border;

releasing the lens, thereby causing said spring to expand such that said spring moves said second edge of said lens underneath said border while said first edge remains underneath said border, and thereby securing said lens in the space between said frame and said backplate; and preventing third and fourth opposite edges of the lens from moving underneath said border by causing said third and fourth edges to contact extensions on the border.

7. A method for making a sign, comprising the steps of:

providing a backplate having a spring mounted on one end thereof;

providing a frame having a border defining a central opening;

assembling said backplate to said frame such that a space exists between said border and said backplate, with said spring located within the space;

providing a lens having first and second opposite edges separated by a distance greater than a width of said central opening;

inserting said first edge of said lens into said space such that said edge contacts said spring and compresses it away from said central opening in a direction substantially parallel to said back plate;

pivoting the lens further into said space until said lens is substantially parallel to said backplate, thereby further compressing said spring in said direction and further inserting said first edge into said space, such that said first edge is completely located beneath said border;

releasing the lens, thereby causing said spring to expand such that said spring moves said second edge of said lens underneath said border while said first edge remains underneath said border, and thereby securing said lens in the space between said frame and said backplate;

providing a design printed on paper with a computer graphics program; and inserting said paper in the space between said lens and said backplate.

8. A method for assembling and disassembling a sign holder, comprising the steps of:

providing a backplate having a spring mounted on one end thereof;

providing a frame having a border defining a central opening;

assembling said backplate to said frame such that a space exists between said border and said backplate, with said spring located within the space;

providing a lens having first and second opposite edges separated by a distance greater than a width of said central opening;

inserting said first edge of said lens into said space such that said edge contacts said spring and compresses it away from said central opening in a direction substantially parallel to said back plate;

pivoting the lens further into said space until said lens is substantially parallel to said backplate, thereby further compressing said spring in said direction and further inserting said first edge into said space, such that said first edge is completely located beneath said border;

releasing the lens, thereby causing said spring to expand such that said spring moves said second edge of said lens underneath said border while said first edge remains underneath said border, and thereby securing said lens in the space between said frame and said backplate; and, subsequently removing said lens by moving the lens such that said first edge contacts said spring and compresses it away from said central opening in a direction substantially parallel to said backplate, and then pivoting the lens from said space.

9. The method of claim 2 wherein the step of assembling said backplate to said frame further comprises the step of securing said backplate to said frame with at least one threaded fastener.

10. The method of claim 2 further comprising the step of orienting the frame relative to the backplate by causing said frame to contact guideblocks formed on an inner surface of the backplate.

11. The method of claim 2 further comprising the step of mounting the backplate on a structure at recessed apertures formed in the backplate.

12. The method of claim 2 further comprising the step of preventing third and fourth opposite edges of the lens from moving underneath the border by causing said third and fourth edges to contact with extensions formed on the frame.

13. The method of claim 2 further comprising the step of inserting paper printed with a design from a computer graphics program within the space.

14. The method of claim 2 further comprising the step of subsequently moving the lens with said spring being compressed away from said central opening in a direction substantially parallel to said backplate, and then pivoting the lens from said space.

15. The method of claim 2 further comprising the step of integrally molding the backplate with a pair of cantilevered springs forming said spring.

16. The method of claim 2 further comprising the step of forming the cantilevered springs with inwardly turned ends.

17. The method of claim 15 further comprising the step of extending the cantilevered springs from a spring block.

* * * * *